US012015629B2

(12) United States Patent
Shao et al.

(10) Patent No.: US 12,015,629 B2
(45) Date of Patent: Jun. 18, 2024

(54) TAILORED NETWORK RISK ANALYSIS USING DEEP LEARNING MODELING

(71) Applicant: Cisco Technology, Inc., San Jose, CA (US)

(72) Inventors: Qihong Shao, Clyde Hill, WA (US); David John Zacks, Vancouver (CA); Yue Liu, Santa Clara, CA (US); Xinjun Zhang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 934 days.

(21) Appl. No.: 17/034,241

(22) Filed: Sep. 28, 2020

(65) Prior Publication Data

US 2022/0103586 A1 Mar. 31, 2022

(51) Int. Cl.
*H04L 9/40* (2022.01)
*G06F 18/211* (2023.01)
*G06F 40/30* (2020.01)
*G06N 3/02* (2006.01)
*H04L 43/065* (2022.01)

(52) U.S. Cl.
CPC ........ *H04L 63/1433* (2013.01); *G06F 18/211* (2023.01); *G06F 40/30* (2020.01); *G06N 3/02* (2013.01); *H04L 43/065* (2013.01)

(58) Field of Classification Search
USPC ........................................................ 726/25
See application file for complete search history.

(56) References Cited

U.S. PATENT DOCUMENTS

| 10,616,257 | B1 | 4/2020 | Soulhi et al. |
| 11,621,080 | B2* | 4/2023 | Cohen .................... G16H 50/30 |
| | | | 705/3 |
| 2015/0373043 | A1 | 12/2015 | Wang et al. |
| 2019/0124104 | A1 | 4/2019 | Apostopoulos |
| 2019/0149425 | A1 | 5/2019 | Larish et al. |
| 2019/0182287 | A1 | 6/2019 | Hanley et al. |
| 2019/0268366 | A1 | 8/2019 | Zeng et al. |

(Continued)

FOREIGN PATENT DOCUMENTS

WO 2020018392 A1 1/2020

OTHER PUBLICATIONS

Hu, Jingjing et al., "I-HMM-Based Multidimensional Network Security Risk Assessment", Digital Object Identifier 10.1109/ACCESS.2019.2961997, Dec. 24, 2019, 12 pages.

(Continued)

*Primary Examiner* — Sakinah White Taylor
(74) *Attorney, Agent, or Firm* — Edell, Shapiro & Finnan, LLC

(57) ABSTRACT

A method, computer system, and computer program product are provided for network risk analysis. A plurality of risk reports relating to a network device in a network are obtained, wherein each risk report is associated with a particular dimension of a plurality of dimensions of risk for the network device in the network. A count of the plurality of risk reports is determined for each dimension of the plurality of dimensions of risk. A regression model is applied to determine a risk value for the network device in the network based on the count of the plurality of risk reports for each dimension and based a role of the network device in the network.

20 Claims, 7 Drawing Sheets

(56) References Cited

U.S. PATENT DOCUMENTS

| | | | |
|---|---|---|---|
| 2019/0319987 A1* | 10/2019 | Levy | H04L 63/083 |
| 2020/0027826 A1* | 1/2020 | Lee | H01L 23/60 |
| 2020/0076835 A1 | 3/2020 | Ladnai et al. | |
| 2020/0162341 A1 | 5/2020 | Vasseur et al. | |
| 2020/0195679 A1 | 6/2020 | Du | |
| 2020/0202268 A1 | 6/2020 | Retna et al. | |
| 2020/0218937 A1 | 7/2020 | Visentini Scarzanella et al. | |
| 2020/0367078 A1 | 11/2020 | Deb et al. | |
| 2020/0410362 A1 | 12/2020 | Turner et al. | |
| 2021/0099490 A1* | 4/2021 | Crabtree | H04L 63/1408 |
| 2021/0334589 A1* | 10/2021 | Plant | G06F 9/542 |

OTHER PUBLICATIONS

Tan J. Goodfellow et al., "Generative Adversarial Nets", 2014, retrieved from Internet Oct. 22, 2020, 9 pages; https://papers.nips.cc/paper/5423-generative-adversarial-nets.pdf.

Sahar Tavakoli et al., "Learning Social Graph Topologies using Generative Adversarial Neural Networks", Jun. 2017, retrieved from Internet Oct. 22, 2020, 10 pages; http://ial.eecs.ucf.edu/pdf/Sukthankar-SBP2017LateBreak.pdf.

Tsung-Yen Yang et al., "Learning Informative and Private Representations via Generative Adversarial Networks", retrieved from Internet Oct. 22, 2020, 10 pages; http://www.cbrinton.net/18bigdata.pdf.

Qihong Shao et al., "Self-Adaptive Anomaly Detection With Deep Reinforcement Learning and Topology", Technical Disclosure Commons, https://www.tdcommons.org/dpubs_series/4369, Jan. 6, 2021, 14 pages.

Jason Devlin et al., "BERT: Pre-training of Deep Bidirectional Transformers for Language Understanding", Association for Computational Linguistics, https://www.aclweb.org/anthology/N19-1423/, Jun. 2019, 16 pages.

Hu Xu et al., "Double Embeddings and CNN-based Sequence Labeling for Aspect Extraction", Association for Computational Linguistics, https://www.aclweb.org/anthology/P18-2094/, Jul. 2018, 7 pages.

* cited by examiner

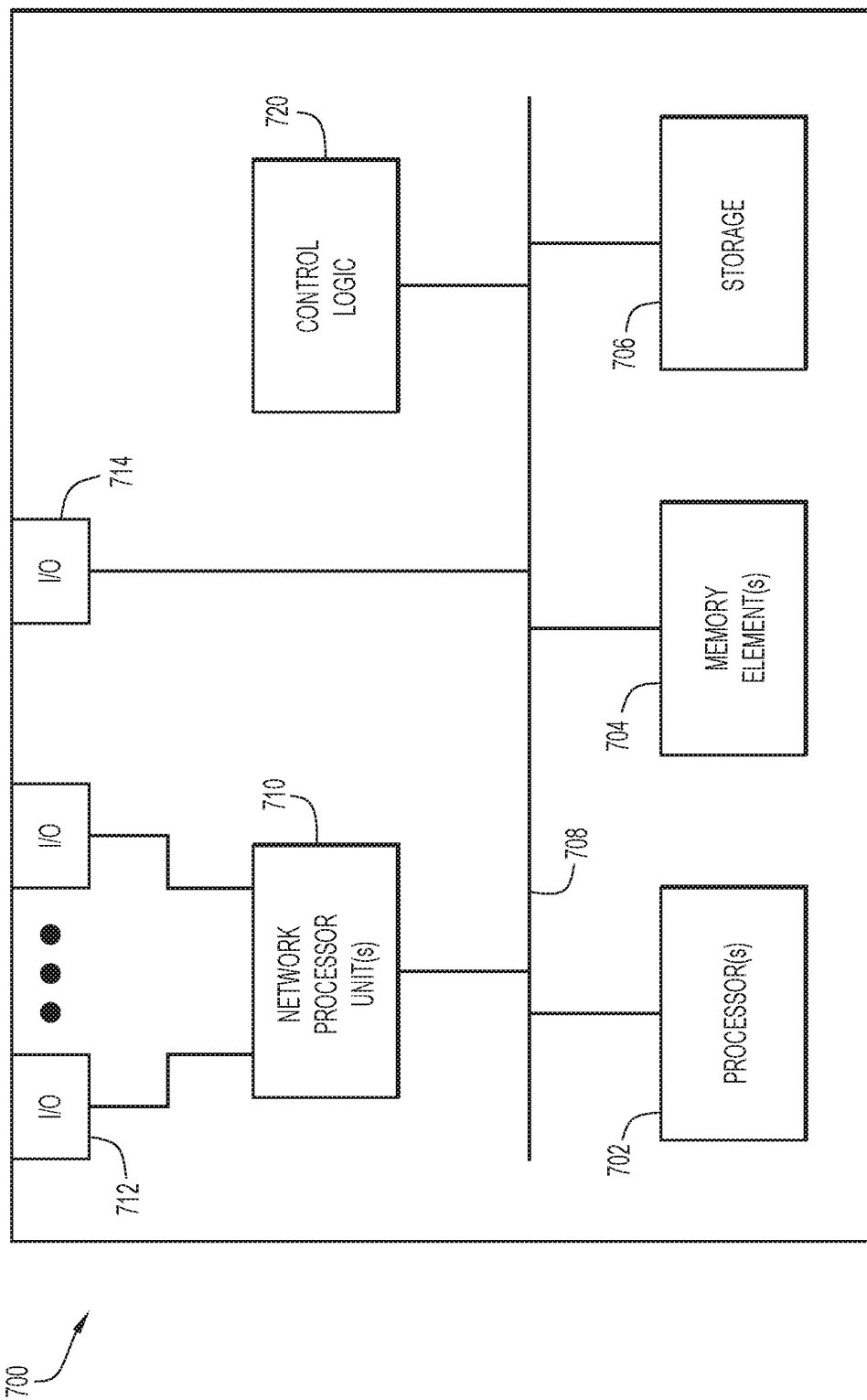

TAILORED NETWORK RISK ANALYSIS USING DEEP LEARNING MODELING

TECHNICAL FIELD

The present disclosure relates to cybersecurity, and more specifically, to network risk analysis using deep learning modeling.

BACKGROUND

In the field of cybersecurity, risk analysis refers to the process of identifying, analyzing, and addressing potential or actual issues that may negatively impact the functionality of computing devices in a network. Developing a risk analysis system can be challenging, as some issues can be undetected if the particular risk analysis approach is incorrect or incomplete. Various aspects of risk may encompass aspects that are not necessarily directly comparable to each other, and therefore cannot be easily summarized into a single value or other representation of risk.

BRIEF DESCRIPTION OF THE DRAWINGS

FIG. 7 is a block diagram depicting a computing device configured to performing risk analysis in accordance with an example embodiment.

DESCRIPTION OF EXAMPLE EMBODIMENTS

Overview

Figure 1:
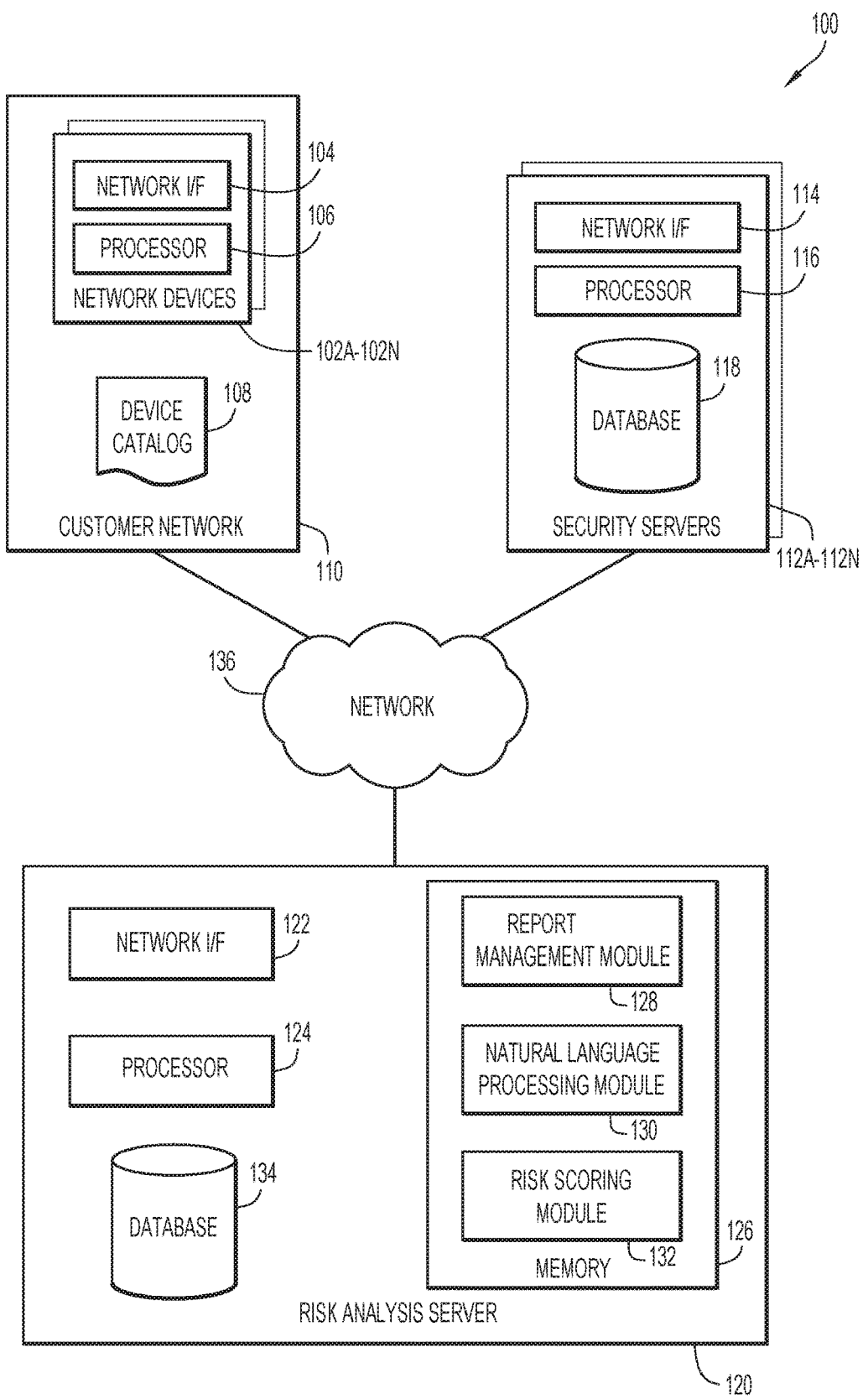
FIG. 1 is a block diagram depicting an environment for network risk analysis in accordance with an example embodiment.

According to one embodiment, techniques are provided for network risk analysis. A plurality of risk reports relating to a network device in a network are obtained, wherein each risk report is associated with a particular dimension of a plurality of dimensions of risk for the network device in the network. A count of the plurality of risk reports is determined for each dimension of the plurality of dimensions of risk. A regression model is applied to determine a risk value for the network device in the network based on the count of the plurality of risk reports for each dimension and based a role of the network device in the network.

EXAMPLE EMBODIMENTS

Embodiments are provided for information technology risk analysis, and more specifically, to network risk analysis using deep learning modeling.

Network risk analysis refers to the process of identifying, analyzing, and addressing potential or actual issues that may negatively impact the functionality of computing devices in a network. Accurately summarizing a network's risk can be difficult, however, as different aspects of risk can be challenging to compare, and a single, overall risk value may not fully convey the nature and degree of risk to which the network may be exposed. Conventional approaches may provide organizations with a risk score that is a weighted sum of all possible issues, or a ranked list of issues that potentially includes hundreds or thousands of items. Moreover, conventional risk analysis techniques provide the same view for every user in an organization, and are not customizable to suit the particular needs of different organizations.

In contrast, embodiments presented herein perform risk analysis in a manner that is customizable for the specific needs and preferences of any organization. Risk values can be fine-tuned so that overall risk scores accurately capture the aspects of risk that are of interest to an organization. Moreover, the embodiments presented herein provide visibility for risk scores, enabling users to understand how risk scores were obtained.

In particular, a deep learning model can be employed that is trained to assess risk of network devices based on an organization's requirements. A risk value can be obtained for any device in a network based on the role of the device in the network, and a number of risk reports associated with the device across multiple dimensions of risk. Moreover, risk values can be determined based on the content of risk reports, which is assessed using a natural language processing model that obtains a semantic understanding of the content of reports to capture descriptions that include domain-specific language. By assessing risk for any device in a network, present embodiments can perform risk analysis at any level of granularity of a network, ranging from a network-level overview, to a fine-grained, device-level view.

Thus, the embodiments presented herein enable risk of a network to be accurately assessed in a manner that is specifically tailored to the individual requirements of an organization while not requiring manual intervention. By focusing on the aspects of cybersecurity that are relevant to an organization, the risk analysis that is provided by present embodiments is therefore achieved using fewer computational resources, as aspects that are not relevant to the organization need not be considered. Additionally, since the risk analysis model is automated and tailored to an organization's requirements, any potential or actual cybersecurity issues can be more rapidly identified and addressed.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments are now described in detail with reference to the figures. FIG. 1 is a block diagram depicting an environment 100 for risk analysis in accordance with an example embodiment. As depicted, environment 100 includes one or more network devices 102A-102N of a customer network 110, one or more security servers 112A-112N, a risk analysis server 120, and a network 136. It is to be understood that the functional division among components of environment 100 have been chosen for purposes of explaining various embodiments and is not to be construed as a limiting example.

Network devices 102A-102N each include a network interface (I/F) 104, and at least one processor 106. Each network device 102A-102N may be a server, a router, a hub, a switch, a bridge, a gateway, a modem, a repeater, an access point, a firewall, an endpoint device (e.g., a laptop computer, a tablet computer, a netbook computer, a personal computer (PC), a desktop computer, a personal digital assistant (PDA), or a smart phone) or any other programmable electronic device capable of executing computer readable program instructions and performing networking-related operations in customer network 110. Network interface 104 enables each network device 102A-102N to send and receive data over a network, such as network 136, as well as within customer network 110. In general, network devices 102A-102N may perform any networking or computing task, including transmitting, receiving, and/or processing of data obtained from, or provided to, network-accessible computing devices, including devices internal and/or external to customer network 110. Each network device 102A-102N may include internal and external hardware components, as depicted and described in further detail with respect to FIG. 7. Moreover, the network devices 102A-102N may be virtual in the sense that they are embodied as software running on a computing device.

Customer network 110 may include a device catalog 108 that includes an inventory of network devices 102A-102N associated with customer network 110, including hardware specifications, a list of installed software and firmware, roles of each network device 102A-102N in customer network 110, and any other data or metadata, including versioning information, error reports, and the like.

Security servers 112A-112N each include a network interface (I/F) 114, at least one processor 116, and a database 118. Each security server 112A-112N may include a rack-mounted server, or any other programmable electronic device capable of executing computer readable program instructions. Network interface 114 enables components of each security server 112A-112N to send and receive data over a network, such as network 136. Security servers 112A-112N may include internal and external hardware components, as depicted and described in further detail with respect to FIG. 7.

In general, each security server 112A-112N provides, or otherwise makes available, risk reports for computing devices, such as network devices 102A-102N. Each security server 112A-122N may be associated with one or more providers of hardware and/or software that is in use by any of network devices 102A-102N. Each risk report may indicate impacted hardware and/or software modules, and each risk report may include a description of the risk and/or the nature of the impact.

In some embodiments, the risk reports may include best practices reports, which may describe recommended settings or configurations of the hardware and/or software components of network devices. For example, best practices reports may include a recommendation to use a particular data encryption mechanism, a recommended firewall rule, a suggested password strength, and the like. In some embodiments, the risk reports may include security advisory reports, such as new viruses, worms, or other malware, zero-day vulnerabilities, current denial-of-service attacks, and the like. In some embodiments, the risk reports include field notice reports, which outline issues that are not security vulnerability-related, but can otherwise relate to risk. Field notice reports may include upgrades, workarounds, or other changes to hardware and/or software of network devices 102A-102N. In some embodiments, risk reports include hardware and/or software end-of-life reports, which indicate a lifecycle of the hardware and/or software, including a planned end date for customer support, updates, hotfixes, availability of replacement parts, and the like. While security servers 112A-112N can serve as external sources of risk reports, in some embodiments, risk reports can additionally or alternatively be obtained from sources internal to customer network 110 (e.g., provided by a user or network device associated with customer network 110). Each risk report can also include an indication of a severity of risk, such as a "low" risk or "high" risk, or the risk severity can be indicated according to a numerical scale or other metric.

Database 118 may include any non-volatile storage media known in the art. For example, database 118 can be implemented with a tape library, optical library, one or more independent hard disk drives, or multiple hard disk drives in a redundant array of independent disks (RAID). Similarly, data in database 118 may conform to any suitable storage architecture known in the art, such as a file, a relational database, an object-oriented database, and/or one or more tables. Database 118 may store data relating to risk reports, including new and previous risk reports. Database 118 may make risk reports accessible, via network 136, to external entities, such as network devices 102A-102N of customer network 110 and risk analysis server 120. Additionally or alternatively, security servers 112A-112N may provide data stored in database 118 to external destinations, either on an ad hoc basis (e.g., as reports become available) or according to a predetermined schedule.

Risk analysis server 120 includes a network interface (I/F) 122, at least one processor 124, memory 126, and database 134. Memory 126 stores software instructions for a report management module 128, a natural language processing module 130, and a risk scoring module 132. Risk analysis server 120 may include a rack-mounted server, or any other programmable electronic device capable of executing computer readable program instructions. Network interface 122 enables components of risk analysis server 120 to send and receive data over a network, such as network 136. In general, risk analysis server 120 enables the assessment of risk for devices in an organization, such as network devices 102A-102N of customer network 110. Risk analysis server 120 may include internal and external hardware components, as depicted and described in further detail with respect to FIG. 7.

Report management module 128, natural language processing module 130, and risk scoring module 132 may include one or more modules or units to perform various functions of the embodiments described below. Report management module 128, natural language processing module 130, and risk scoring module 132 may be implemented by any combination of any quantity of software and/or hardware modules or units, and may reside within memory 126 of risk analysis server 120 for execution by a processor, such as processor 124.

Report management module 128 may obtain and process risk reports so that risk analysis server 120 and its modules may perform risk analysis in accordance with the embodiments presented herein. Report management module 128 may collect risk reports that relate to network devices 102A-102N, which may be obtained and/or received from customer network 110 and/or security servers 112A-112N. For example, risk reports can be obtained from database 118 of security servers 112A-112N and/or from other network-accessible locations, including cloud locations. Report management module 128 may categorize reports into one or more dimensions of risk, such as a best practices dimension, a security advisories dimension, a field notices dimension, a software end-of-life dimension, and a hardware end-of-life dimension. A report can be associated with one or more dimensions of risk based on metadata indicating a risk dimension, based on the presence or absence of keywords, based on the source from which the report is obtained, and the like. Reports may be obtained based on relevance, which is indicated according to device catalog 108; for example, in some embodiments, report management module 128 may obtain, categorize, and/or otherwise process reports that relate to software, hardware, and/or firmware of network devices 102A-120N as indicated by device catalog 108.

Report management module 128 may organize risk reports by linking the network devices 102A-102N with associated reports. For example, report management module 128 may generate an output list that includes an entry for a particular device of network devices 102A-102N indicating that the particular device is associated with three hardware end-of-life reports, one field notices report, and one best practices report. Report manager module 128 may obtain and process risk reports according to a predetermined schedule, or on an ad hoc basis as risk reports become available and/or when device catalog 108 is updated.

Natural language processing module 130 may process risk reports to obtain a semantic understanding of the content of the reports that can be used during risk analysis. Natural language processing module 130 may utilize conventional or natural language processing and/or machine learning techniques in order to generate a vector representation for each risk report that can be represented in a vector space model. In particular, text of each risk report, including the description, the title, and any metadata, can be processed to learn the embedding of the report in a vector space. In some embodiments, natural language processing module 130 may generate reduced vectors, based on different sections of a risk report, which are then concatenated or otherwise combined in order to output an overall vector representation of the risk report. For example, natural language processing module 130 may initially generate reduced vectors based on an affected products section, a problem description section, a symptoms section, a solution section, and a background knowledge section of a risk report; the resulting five reduced vectors can then be concatenated to generate a vector representation of the risk report that represents the word embeddings of the report with respect to other risk reports represented in a vector space. Each vector representation is associated with a particular risk report and may be assigned a unique identifier by natural language processing module 130.

Risk scoring module 132 analyzes risk reports that are associated with network devices 102A-102N in order to assess risk for individual devices and/or groups of devices. Risk scoring module 132 may utilize conventional or other machine learning in order to determine risk values based on risk reports. In some embodiments, risk scoring module 132 trains and applies a regression model that utilizes a deep neural network. In some embodiments, risk scoring module 132 employs a model that is trained by another computing device or group of devices; for example, the model can be trained on a cloud platform and then provided to risk scoring module 132. The regression model may be trained using input data that includes multi-dimensional examples of risk reports for network devices, which are labeled with corresponding risk values for those devices, and which may also be specific to the role of each device. The risk values can be user-assessed and can be provided by administrators, subject matter experts, or other users. Thus, risk analysis can be tailored to a particular organization, such as the organization associated with customer network 110, by training the model using ratings of risk that accurately reflect how the organization would prefer for risk to be assessed. For example, a number of risk reports that might individually appear to be low-risk but are all tied to a particular device that serves a critical role in customer network 110 (e.g., a router) may be user-scored as being associated with a high risk value; accordingly, a model trained on such examples would score risk reports associated with a same model of device deployed in a same (or similar) role more highly to reflect the level of risk reported by the evaluators.

In particular, risk scoring module 132 may employ a neural network that can dynamically select a regression type (e.g., linear, logistic, polynomial, etc.) for assessing risk for a device based on analyzed risk reports and the role of the device. In various embodiments, the neural network can include any number of hidden layers, such as one hidden layer, two hidden layers, or more. Each hidden layer may have any number of units; in an example embodiment, a neural network is provided that includes two hidden layers, each hidden layer having sixty-four units or more. In some embodiments, the neural network is a feed-forward network terminating in a single unit. The single unit may not have an activation function, and may output a scalar that is a continuous value representing risk. In some embodiments, the model is trained using a mean square error loss function, and a mean absolute error evaluation matrix to evaluate the differences between predictions of risk and targets (e.g., the user-provided estimates of risk values).

In some embodiments, risk scoring module 132 trains a model to identify risk on a device level. Additionally or alternatively, risk scoring module 132 can develop a model that assesses risk based on a group of multiple devices. For example, risk scoring module 132 may use training data that includes risk reports for a group of devices, along with the roles of the devices in the group and the user-provided estimates of risk values for the group of devices given each example set of risk reports.

In some embodiments, risk scoring module 132 trains a regression model based on a count of risk reports for each dimension of risk for network devices 102A-102N. For instance, one example in a set of training data may include a number of best practices reports, a number of security advisories, a number of field notices, a number of software end-of-life reports, and a number of hardware end-of-life reports, along with the role of the device and the user-provided risk value for the device. The severity of each risk report can also be included; for example, counts may be independently performed on the basis of both dimension of risk and severity. By training a model using a set of training data that includes many such examples, the resulting model will be able to output estimates of risk for one or more of the network devices 102A-102N based on the role of the device and the count of risk reports per dimension of risk that are associated with the device.

In some embodiments, risk scoring module 132 trains a regression model based on the vector representations of the risk reports for each dimension of risk for network devices 102A-102N. Vector representations of risk reports can be used as training data; for instance, one example in a set of training data may include vector representations for each risk report that is associated with a device, along with the role of the device and a user-provided risk value for the device. In some embodiments, the training data includes both vector representations of risk reports as well as counts of risk reports, with each vector representation contributing toward the count of risk reports in one or more dimensions of risk. Thus, a regression model trained using both counts and vector representations of risk reports may assess risk for a device (or group of devices) based on the role of the device, the count of risk reports, and the vector representations of the risk reports.

Database 134 may include any non-volatile storage media known in the art. For example, database 134 can be implemented with a tape library, optical library, one or more independent hard disk drives, or multiple hard disk drives in a redundant array of independent disks (RAID). Similarly, data in database 134 may conform to any suitable storage architecture known in the art, such as a file, a relational database, an object-oriented database, and/or one or more tables. Database 134 may store data that includes training data for regression models, trained regression models, risk report data, vector representation data, and any other data relating to risk analysis.

Network 136 may include a local area network (LAN), a wide area network (WAN) such as the Internet, or a combination of the two, and includes wired, wireless, or fiber optic connections. In general, network 136 can be any combination of connections and protocols known in the art that will support communications between network devices 102A-102N of customer network 110, security servers 112A-112N, and/or risk analysis server 120 via their respective network interfaces in accordance with the described embodiments.

Figure 2:
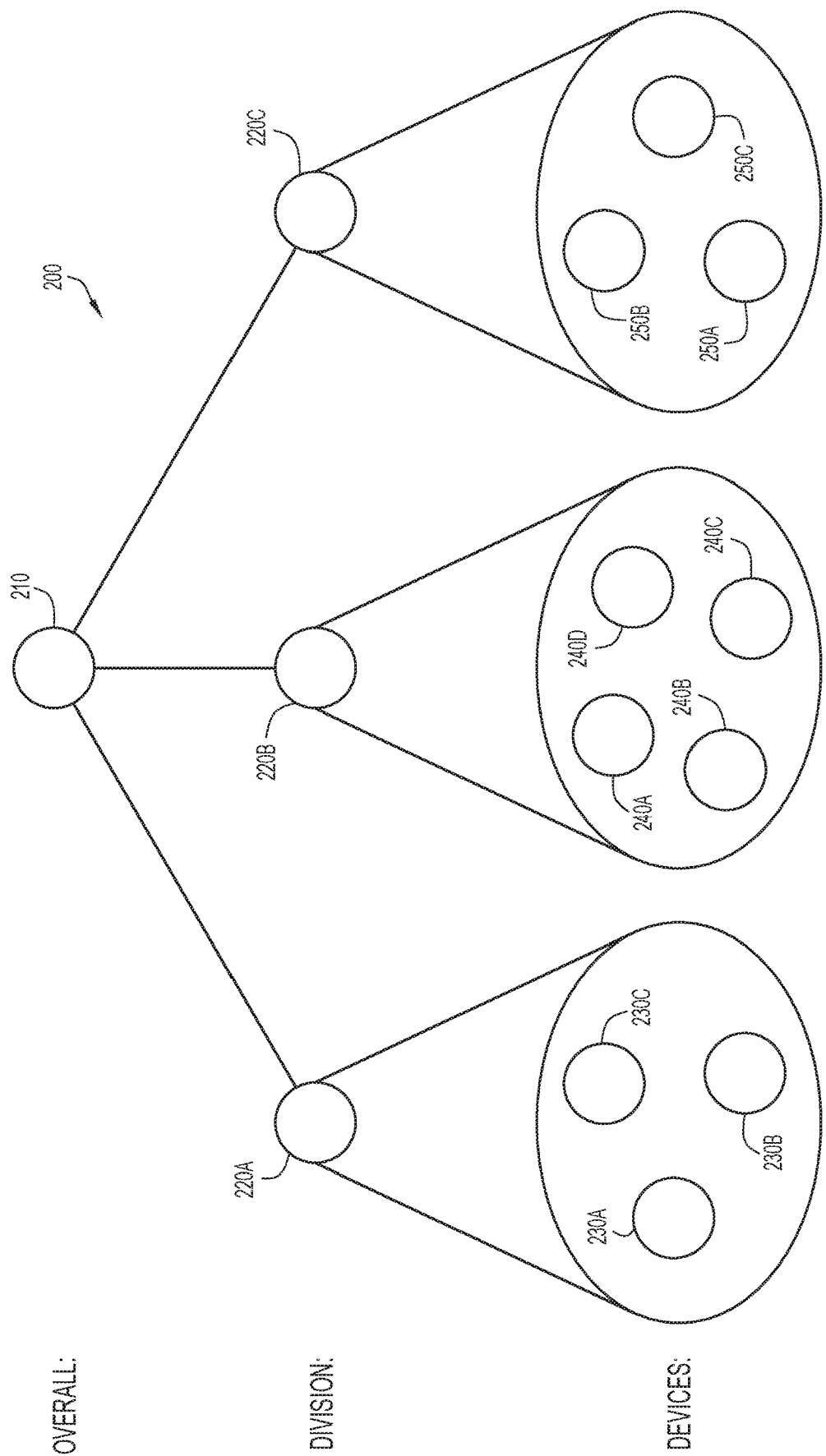
FIG. 2 is a diagram depicting a hierarchical representation of risk for a network in accordance with an example embodiment.

FIG. 2 is a diagram depicting a hierarchical representation 200 of risk for a network in accordance with an example embodiment. The hierarchical representation 200 includes three levels: an overall level, a division level, and a device level. It is to be understood that the number of levels, and the number of entities and each level, of hierarchical representation 200 have been chosen for purposes of explaining various embodiments, and thus hierarchical representation 200 is not to be construed as a limiting example.

As depicted, hierarchical representation includes an overall level 210, a first division 220A including devices 230A, 230B and 230C, a second division 220B including devices 240A, 240B, 240C and 240D, and a third division 220C including devices 250A, 250B and 250C. Divisions can be any sub-grouping of devices, and can be based on geographical location, role, department, and the like. The devices may include any computing devices of a customer network, and in some embodiments may be implemented using network devices 102A-102N of environment 100.

A risk value can be provided at each level of hierarchical representation 200. For example, a user may obtain an overall risk score at level 210 that assesses risk for every device in every division. A user may also select a particular division, such as division 220A or division 220C, to obtain a risk value that is specific to devices belonging to that division. Additionally or alternatively, a risk value can be obtained for any individual device, such as device 230A, 240B, or 250D. Thus, the embodiments presented herein enable assessment of risk at any level of a customer network.

In some embodiments, hierarchical representation 200 may be created for a customer network based on tagging of network devices with one or more tags. Thus, flexible groups of devices can be created; these groups may not be mutually exclusive, as devices can belong to multiple groups. For example, an airport may assign tags to devices as belonging to a group such as "Baggage," "Ticketing," "Terminal A," "Terminal B," and the like. By organizing hierarchical representation 200 based on tags, risk can be assessed for any arbitrary number of devices grouped based on a common role, function, hardware, software, and the like. In some embodiments, tags can include any attribute of a network device, such as a device type, a device role, a software element and version installed on a device, a software element and version installed on a device that differs from pre-defined installation standards, a hardware element installed on a device, an indication that a device is different from a predefined standard device for its role, a device's geographic location (e.g., country, city, site, building, floor, room), and/or any other customer-defined tags. In some embodiments, the role of a network device is defined according to a tag or combination of tags of the device.

Figure 3:
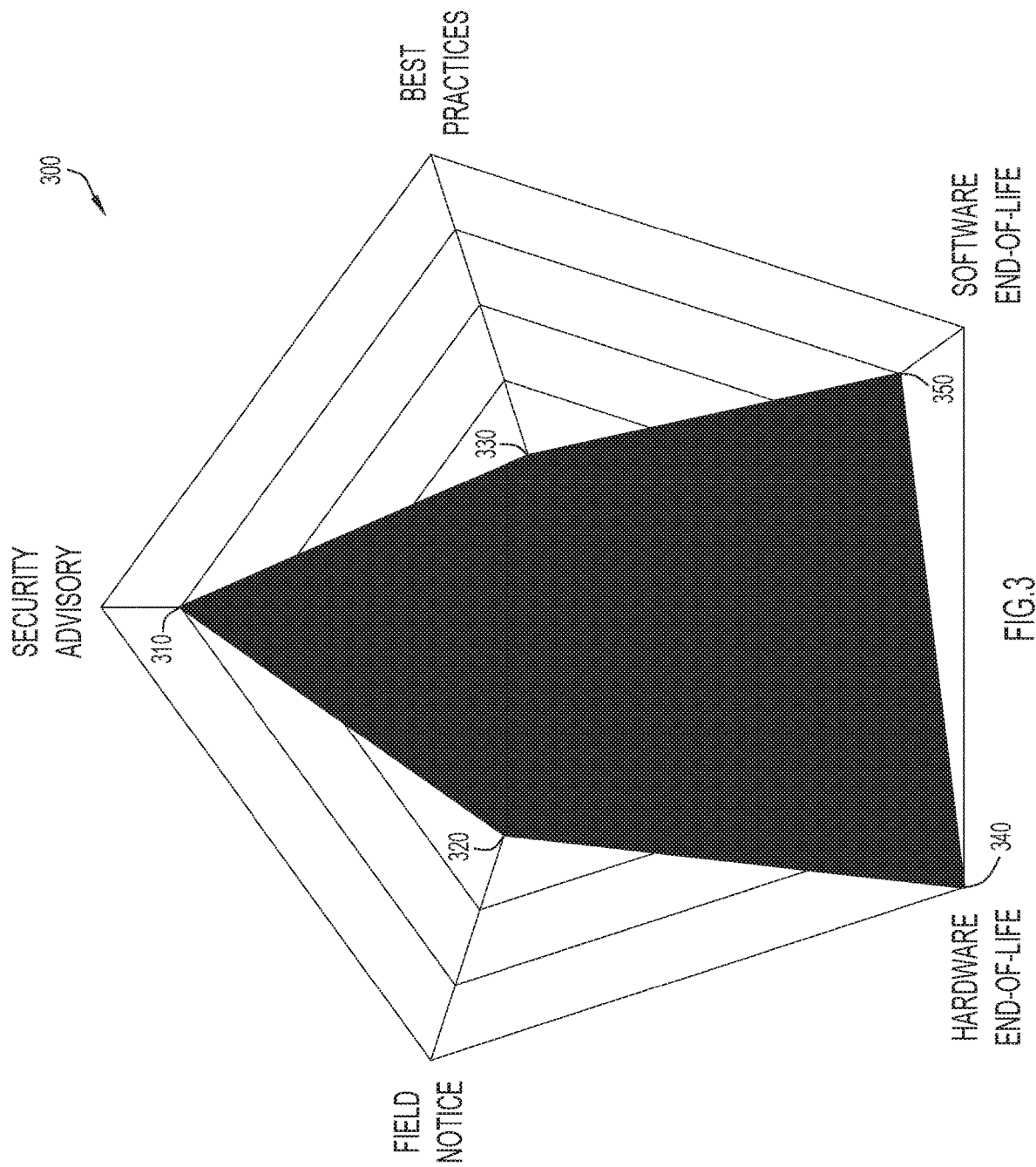
FIG. 3 is a radar chart depicting a multi-dimensional assessment of risk for a network device in accordance with an example embodiment.

FIG. 3 is a radar chart 300 depicting a multi-dimensional assessment of risk for a computing device in accordance with an example embodiment. The radar chart 300 may represent risk for a device (e.g., any of network devices 102A-102N) or for a group of devices. As depicted, risk is assessed in five dimensions: a security advisory dimension, a best practices dimension, a field notice dimension, a hardware end-of-life dimension, and a software end-of-life dimension.

Radar chart 300 may represent counts for risk reports for each dimension of a particular device or group of devices. With the number of levels from the center corresponding to the number of risk reports in a dimension, the security advisory dimension has a count 310 of four risk reports, the field notice dimension has a count 320 of two risk reports, the best practices dimension has a count 330 of one risk report, the hardware end-of-life dimension has a count 340 of five risk reports, and the software end-of-life dimension has a count 350 of four risk reports. These counts can be fed into the machine learning model of risk scoring module 132 in order to determine an overall risk value for device or group of devices represented by radar chart 300.

Figure 4:
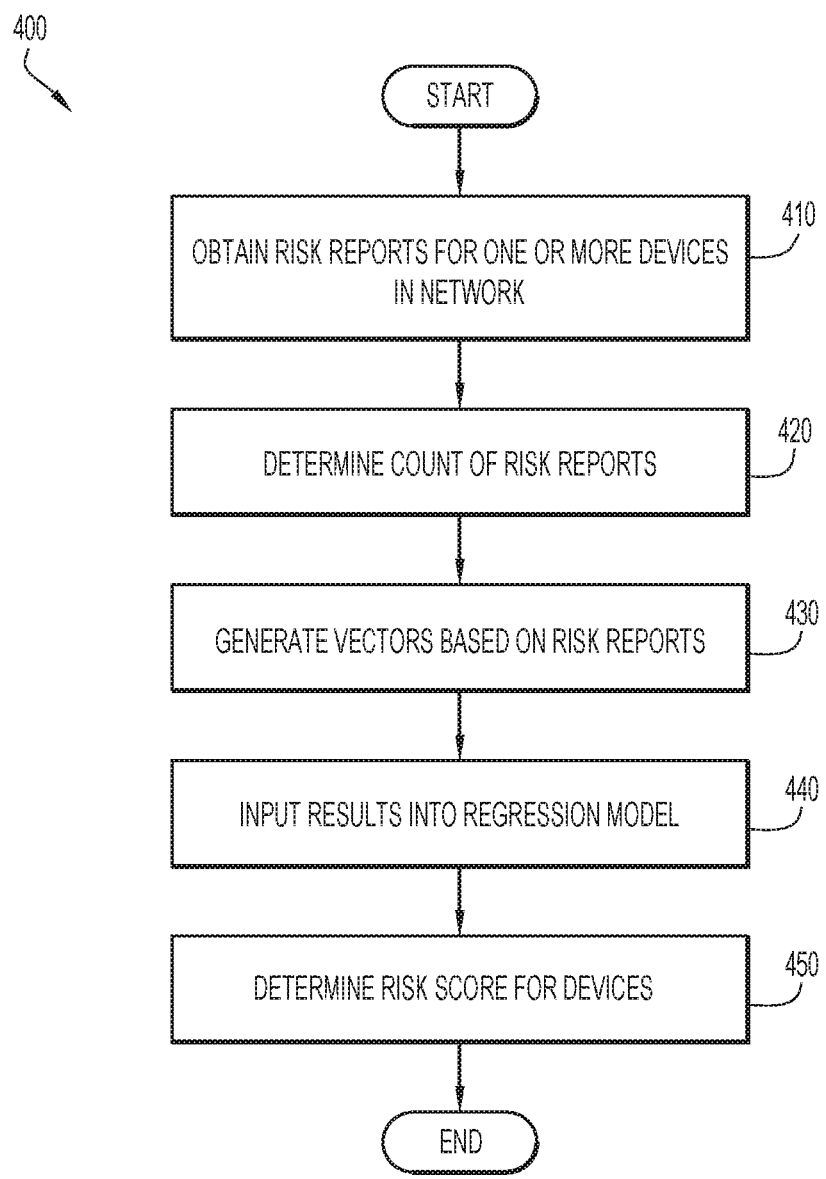
FIG. 4 is a flow chart depicting a method for determining a risk score for one or more network devices, in accordance with an example embodiment.

FIG. 4 is a flow chart depicting a method 400 for determining a risk score for one or more network devices, in accordance with an example embodiment.

Risk reports for one or more devices in a network are obtained at operation 410. Risk reports are obtained by, or provided to, risk analysis server 120 on the basis of the risk reports being relevant to network devices 102A-102N in customer network 110. In particular, risk reports are obtained that relate to the software, hardware, and/or firmware of network devices 102A-102N, including any settings or configurations thereof.

A count of the risk reports is determined at operation 420. The risk reports may initially be categorized as being associated with one or more dimensions of risk. For example, a risk report may be associated with a security advisory dimension, a field notice dimension, a best practices dimension, a hardware end-of-life dimension, and/or a software end-of-life dimension. All of the risk reports for each dimension of a device, or group of devices, may be counted in order to obtain a risk report count for each dimension of risk that is being assessed by an organization.

Vectors are generated based on the risk reports at operation 430. Natural language processing module 130 may generate vector representations of the text of each risk report, which capture the word embeddings of the reports in a vector space model. Each report may thus be converted into a vector representation, enabling a machine learning model to assess risk based on the semantic content of the reports.

The resulting counts and/or vector representations are provided as input into a regression model at operation 440. The regression model may be trained to predict a risk value based on counts of risk reports per dimension of risk, based on vector representations, or based on a combination thereof. In one embodiment, the regression model includes a neural network having an input layer, two hidden layers of sixty-four units each, and an output layer.

A risk score is determined for the one or more network devices at operation 450. The output of the regression model may include a value indicative of risk. For example, the value may range between 0 and 1.0, with higher values indicating an increased level of risk for the assessed device or group of devices. The risk score may be provided to a user via a device of network devices 102A-102N for review, and further actions may be taken based on the risk score.

Figure 5:
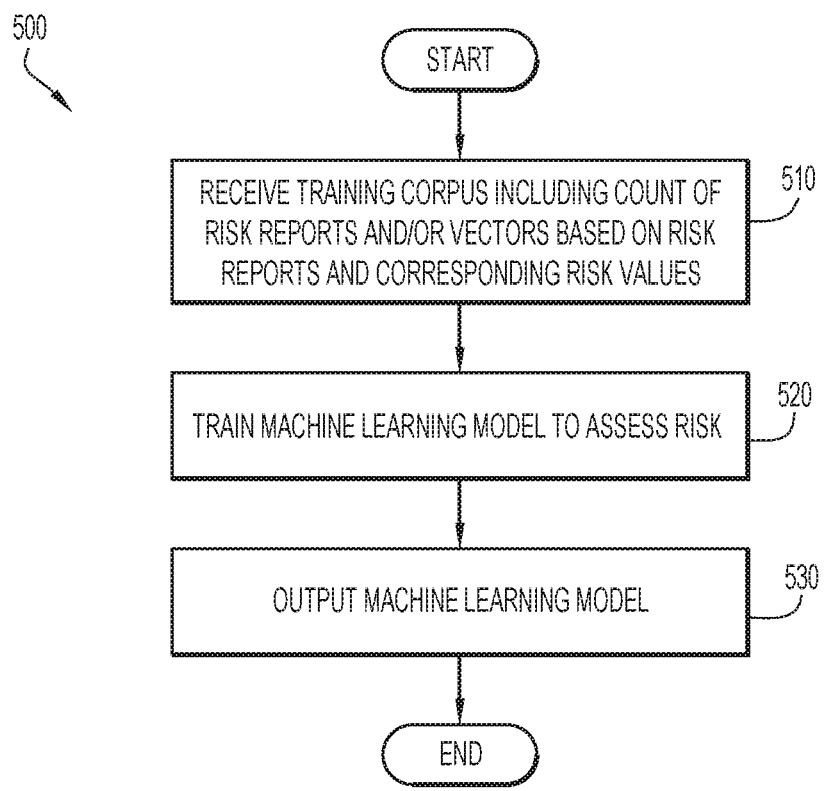
FIG. 5 is a flow chart depicting a method for training and applying a machine learning model for determining a risk score in accordance with an example embodiment.

FIG. 5 is a flow chart depicting a method 500 for training and applying a machine learning model for determining a risk score in accordance with an example embodiment.

A training corpus, including a count of risk reports and/or vector representations of risk reports along with corresponding risk values, is received at operation 510. The training corpus is a data set in which example sets of risk reports have been labeled with risk values by assessors in order to reveal the level of risk reflected in the risk reports with respect to the particular device, or group of devices, to which that set of risk reports relates. The examples sets of risk reports in the training corpus may also be labeled with a role of the associated network device, which can be indicated using tags as described with reference to hierarchical representation 200 of FIG. 2.

A machine learning model is trained to assess risk at operation 520. The machine learning model employs regression modeling to identify the degree to which independent values (i.e., the input counts of risk reports and/or vector representations) have an effect on the outcome (i.e., the risk values). In one embodiment, a feed-forward neural network having two hidden layers, each with sixty-four units, is employed. During training, a loss function, such as a mean square error function, is employed in order to calculate model error and to optimize the neural network accordingly.

The trained machine learning model is output by risk scoring module 132 at operation 530. Once the model is trained, the model may be applied by providing risk report counts and/or vector representations that are associated with one or more network devices 102A-102N in order to obtain risk values.

Figure 6:
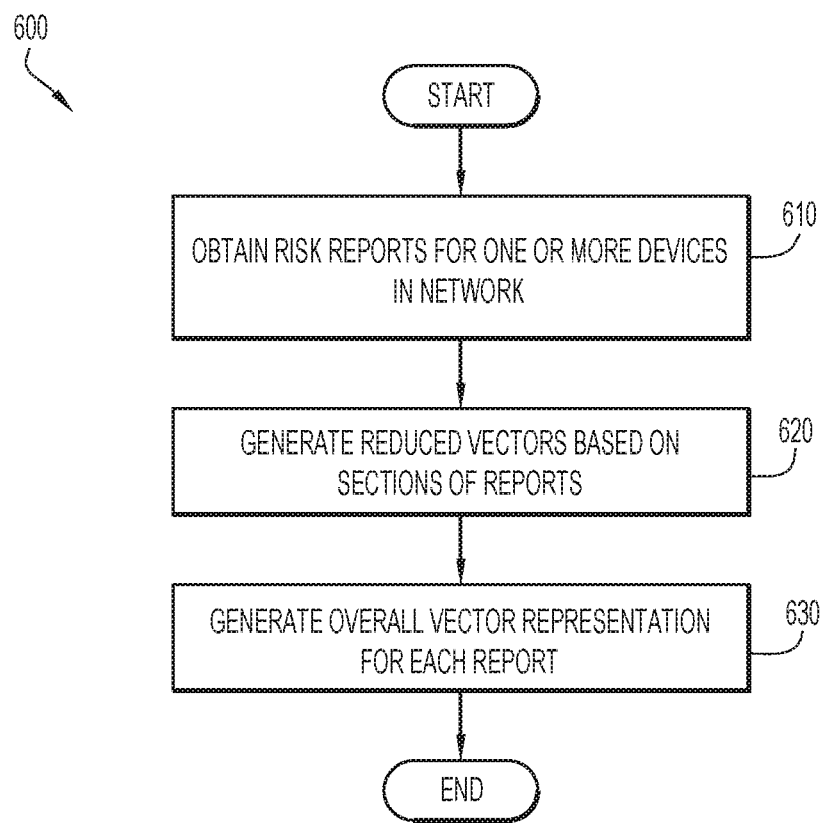
FIG. 6 is a flow chart depicting a method for developing a vector space model for risk analysis in accordance with an example embodiment.

FIG. 6 is a flow chart depicting a method 600 for developing a vector space model for risk analysis in accordance with an example embodiment.

Risk reports for one or more devices in a network are obtained at operation 610. The risk reports may be categorized as being associated with one or more dimensions of risk, and may each include several sections, such as an affected products section, a problem description section, a symptoms section, a solution section, and a background knowledge section.

Reduced vectors are generated by based on the sections of each report at operation 620. The text of each section may be converted to a reduced vector using conventional or other document embedding techniques, such as Doc2Vec; the resulting reduced vectors are each a numerical representation of a section of a risk report. In one embodiment, a bidirectional long short-term memory (LSTM) convolutional neural network (CNN) model may be employed to output reduced vectors for each section of a collection of risk reports.

An overall vector representation is generated for each report at operation 630. The overall vector for a risk report can be provided by concatenating the constituent reduced vectors for each section of the report. As these vector representations are created by learning the embeddings of words in a collection of risk reports, a semantic understanding of domain-specific language can be achieved. For example, using techniques to compare the closeness of vectors, such as cosine similarity, the resulting vector space model can be analyzed to identify that a term such as "BGP" is equivalent to "Border Gateway Protocol," and that BGP/Border Gateway Protocol is semantically similar to the term "Label Distribution Protocol" or "LDP." Additionally, each risk report's vector representation may be assigned a unique identifier to provide additional semantic information to the feature matrix.

Referring to FIG. 7, FIG. 7 illustrates a hardware block diagram of a computing device 700 that may perform functions associated with operations discussed herein in connection with the techniques depicted in FIGS. 1-6. In various embodiments, a computing device, such as computing device 700 or any combination of computing devices 700, may be configured as any entity/entities as discussed for the techniques depicted in connection with FIGS. 1-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The programs described herein are identified based upon the application for which they are implemented in a specific embodiment. However, it should be appreciated that any particular program nomenclature herein is used merely for convenience, and thus the described embodiments should not be limited to use solely in any specific application identified and/or implied by such nomenclature.

Data relating to network risk analysis (e.g., customer network data, network device specification and role data, risk report data, machine learning data including training corpus data and trained model data, natural language processing data including vector space model data, etc.) may be stored within any conventional or other data structures (e.g., files, arrays, lists, stacks, queues, records, etc.) and may be stored in any desired storage unit (e.g., database, data or other repositories, queue, etc.). The data transmitted between network devices 102A-102N, security servers 112A-112N, and/or risk analysis server 120 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to network risk analysis (e.g., customer network data, network device specification and role data, risk report data, machine learning data including training corpus data and trained model data, natural language processing data including vector space model data, etc.) may include any information provided to, or generated by, network devices 102A-102N, security servers 112A-112N, and/or risk analysis server 120. Data relating to network risk analysis may include any desired format and arrangement, and may include any quantity of any types of fields of any size to store any desired data. The data relating to network risk analysis may include any data collected about entities by any collection mechanism, any combination of collected information, and any information derived from analyzing collected information.

The present embodiments may employ any number of any type of user interface (e.g., Graphical User Interface (GUI), command-line, prompt, etc.) for obtaining or providing information (e.g., data relating to network risk analysis), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of assessing risk for a network of computing devices.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., communications software, server software, report management module 128, natural language processing module 130, risk scoring module 132, etc.). These systems may include any types of monitors and input devices (e.g., keyboard, mouse, voice recognition, etc.) to enter and/or view information.

It is to be understood that the software (e.g., communications software, server software, report management module 128, natural language processing module 130, risk scoring module 132, etc.) of the present embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present embodiments may alternatively be implemented by any type of hardware and/or other processing circuitry.

The system may employ any number of any conventional or other databases, data stores or storage structures (e.g., files, databases, data structures, data or other repositories, etc.) to store information (e.g., data relating to network risk analysis). The database system may be implemented by any number of any conventional or other databases, data stores or storage structures (e.g., files, databases, data structures, data or other repositories, etc.) to store information (e.g., data relating to network risk analysis). The database system may be included within or coupled to the server and/or client systems. The database systems and/or storage structures may be remote from or local to the computer or other processing systems, and may store any desired data (e.g., data relating to network risk analysis).

The present embodiments are not limited to the specific tasks or algorithms described above, but may be utilized for any number of applications in the relevant fields, including, but not limited to, utilizing deep learning techniques to perform tailored analysis of computing networks with respect to any desired topic.

The terminology used herein is for the purpose of describing particular embodiments only and is not intended to be limiting of the described embodiments. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the described embodiments. The embodiments were chosen and described in order to enable others of ordinary skill in the art to understand the various embodiments with various modifications as are suited to the particular use contemplated.

In one form, a method is provided comprising: obtaining a plurality of risk reports relating to a network device in a network, wherein each risk report is associated with a particular dimension of a plurality of dimensions of risk for the network device in the network, determining a count of risk reports for each dimension of the plurality of dimensions of risk, and applying a regression model to determine a risk value for the network device in the network based on the count of risk reports for each dimension and based a role of the network device in the network.

In another form, the method further includes generating a vector representation for each risk report, wherein the vector representation of each risk report represents word embeddings of the report, and applying the regression model includes determining the risk value based on the vector representation of each risk report.

In another form, the method further includes training the regression model using groups of risk reports representing the plurality of dimensions of risk, wherein each group of risk reports is labeled with an estimated risk value.

In another form, training includes training the regression model based on one or more of: the count of risk reports for each dimension of risk represented in each group of risk reports, and a vector representation of each risk report in each group of risk reports, wherein the vector representation of each risk report represents word embeddings of the risk report.

In another form, the plurality of dimensions of risk include one or more of: a best practices dimension, a security advisories dimension, a field notices dimension, a software end-of-life dimension, and a hardware end-of-life dimension.

In another form, the regression model comprises a neural network including at least two hidden layers.

In another form, the role of the network device is determined according to one or more user-provided tags, each tag describing an attribute of the network device with respect to the network.

In one form, a computer system is provided, comprising: one or more computer processors; one or more computer readable storage media; program instructions stored on the one or more computer readable storage media for execution by at least one of the one or more computer processors, the program instructions comprising instructions to: obtain, from a network device in a network, a plurality of risk reports and a role of the network device, wherein each risk report is associated with a particular dimension of a plurality of dimensions of risk for the network device in the network, determine a count of risk reports for each dimension of the plurality of dimensions of risk, and apply a regression model to determine a risk value for the network device in the network based on the count of reports for each dimension and the role of the network device.

In one form, one or more computer readable storage media is provided, the one or more computer readable storage media collectively having program instructions embodied therewith, the program instructions executable by a computer to cause the computer to: obtain, from a network device in a network, a plurality of risk reports and a role of the network device, wherein each risk report is associated with a particular dimension of a plurality of dimensions of risk for the network device in the network, determine a count of risk reports for each dimension of the plurality of dimensions of risk, and apply a regression model to determine a risk value for the network device in the network based on the count of reports for each dimension and the role of the network device.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining a plurality of risk reports relating to a network device in a network, wherein each risk report is associated with a particular dimension of a plurality of dimensions of risk for the network device in the network, wherein the plurality of risk reports are obtained from one or more providers of hardware or software for the network device, and wherein the plurality of dimensions of risk include one or more of: a best practices dimension, a security advisories dimension, and a field notices dimension;
   determining a count of the plurality of risk reports for each dimension of the plurality of dimensions of risk; and
   applying a regression model to determine a risk value for the network device in the network based on the count of the plurality of risk reports for each dimension and based a role of the network device in the network.

2. The computer-implemented method of claim 1, further comprising:
   generating a vector representation of each risk report of the plurality of risk reports, wherein the vector representation of each risk report represents word embeddings of the risk report; and
   wherein applying the regression model comprises determining the risk value based on the vector representation of each risk report.

3. The computer-implemented method of claim 1, further comprising:
   training the regression model using groups of risk reports of the plurality of risk reports, the groups of risk reports representing the plurality of dimensions of risk, wherein each group of risk reports is labeled with an estimated risk value.

4. The computer-implemented method of claim 3, wherein training comprises training the regression model based on one or more of: the count of the plurality of risk reports for each dimension of risk represented in each group of risk reports, and a vector representation of each risk report in each group of risk reports, wherein the vector representation of each risk report represents word embeddings of the risk report.

5. The computer-implemented method of claim 1, wherein the plurality of dimensions of risk further include one or more of: a software end-of-life dimension, and a hardware end-of-life dimension.

6. The computer-implemented method of claim 1, wherein the regression model comprises a neural network including at least two hidden layers.

7. The computer-implemented method of claim 1, wherein the role of the network device is determined according to one or more user-provided tags, each tag describing an attribute of the network device with respect to the network.

8. A computer system comprising:
one or more computer processors;
one or more computer readable storage media;
program instructions stored on the one or more computer readable storage media for execution by at least one of the one or more computer processors, the program instructions comprising instructions to:
obtain a plurality of risk reports relating to a network device in a network, wherein each risk report is associated with a particular dimension of a plurality of dimensions of risk for the network device in the network, wherein the plurality of risk reports are obtained from one or more providers of hardware or software for the network device, and wherein the plurality of dimensions of risk include one or more of: a best practices dimension, a security advisories dimension, and a field notices dimension;
determine a count of the plurality of risk reports for each dimension of the plurality of dimensions of risk; and
apply a regression model to determine a risk value for the network device in the network based on the count of the plurality of risk reports for each dimension and based a role of the network device in the network.

9. The computer system of claim 8, wherein the program instructions further comprise instructions to:
generate a vector representation of each risk report of the plurality of risk reports, wherein the vector representation of each risk report represents word embeddings of the risk report; and
wherein applying the regression model comprises determining the risk value based on the vector representation of each risk report.

10. The computer system of claim 8, wherein the program instructions further comprise instructions to:
train the regression model using groups of risk reports of the plurality of risk reports, the groups of risk reports representing the plurality of dimensions of risk, wherein each group of risk reports is labeled with an estimated risk value.

11. The computer system of claim 10, wherein the instructions to train comprise instructions to train the regression model based on one or more of: the count of the plurality of risk reports for each dimension of risk represented in each group of risk reports, and a vector representation of each risk report in each group of risk reports, wherein the vector representation of each risk report represents word embeddings of the risk report.

12. The computer system of claim 8, wherein the plurality of dimensions of risk further include one or more of: a software end-of-life dimension, and a hardware end-of-life dimension.

13. The computer system of claim 8, wherein the regression model comprises a neural network including at least two hidden layers.

14. The computer system of claim 8, wherein the role of the network device is determined according to one or more user-provided tags, each tag describing an attribute of the network device with respect to the network.

15. A computer program product comprising one or more computer readable storage media collectively having program instructions embodied therewith, the program instructions executable by a computer to cause the computer to:
obtain a plurality of risk reports relating to a network device in a network, wherein each risk report is associated with a particular dimension of a plurality of dimensions of risk for the network device in the network, wherein the plurality of risk reports are obtained from one or more providers of hardware or software for the network device, and wherein the plurality of dimensions of risk include one or more of: a best practices dimension, a security advisories dimension, and a field notices dimension;
determine a count of the plurality of risk reports for each dimension of the plurality of dimensions of risk; and
apply a regression model to determine a risk value for the network device in the network based on the count of the plurality of risk reports for each dimension and based a role of the network device in the network.

16. The computer program product of claim 15, wherein the program instructions further cause the computer to:
generate a vector representation for each risk report of the plurality of risk reports, wherein the vector representation of each report represents word embeddings of the risk report; and
wherein applying the regression model comprises determining the risk value based on the vector representation of each risk report.

17. The computer program product of claim 15, wherein the program instructions further cause the computer to:
train the regression model using groups of risk reports of the plurality of risk reports, the groups of risk reports representing the plurality of dimensions of risk, wherein each group of risk reports is labeled with an estimated risk value.

18. The computer program product of claim 17, wherein the instructions to train comprise instructions to train the regression model based on one or more of: the count of the plurality of risk reports for each dimension of risk represented in each group of risk reports, and a vector representation of each risk report in each group of risk reports, wherein the vector representation of each risk report represents word embeddings of the risk report.

19. The computer program product of claim 15, wherein the plurality of dimensions of risk further include one or more of: a software end-of-life dimension, and a hardware end-of-life dimension.

20. The computer program product of claim 15, wherein the regression model comprises a neural network including at least two hidden layers.

* * * * *